US010366146B2

(12) United States Patent
Alon et al.

(10) Patent No.: US 10,366,146 B2
(45) Date of Patent: Jul. 30, 2019

(54) METHOD FOR ADJUSTING CONTENT OF A WEBPAGE IN REAL TIME BASED ON USERS ONLINE BEHAVIOR AND PROFILE (71) Applicant: Adobe Inc., San Jose, CA (US)

(72) Inventors: Mickey Alon, Herzlia (IL); Mike Telem, Giv'at Shmuel (IL)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/394,729

(22) Filed: Dec. 29, 2016

(65) Prior Publication Data
US 2017/0109330 A1 Apr. 20, 2017

Related U.S. Application Data (63) Continuation of application No. 14/086,200, filed on Nov. 21, 2013, now Pat. No. 9,569,785.

(60) Provisional application No. 61/728,865, filed on Nov. 21, 2012.

(51) Int. Cl.
G06F 17/20 (2006.01)
G06F 17/22 (2006.01)
G06Q 30/02 (2012.01)
G06F 16/951 (2019.01)
G06N 7/00 (2006.01)
(Continued)

(52) U.S. Cl.
CPC ........ *G06F 17/2247* (2013.01); *G06F 16/951* (2019.01); *G06N 7/005* (2013.01); *G06Q 30/0201* (2013.01); *G06Q 30/0202* (2013.01); *G06Q 30/0641* (2013.01); *H04L 67/22* (2013.01); *H04L 67/306* (2013.01)

(58) Field of Classification Search
CPC .................................................. G06F 17/2247
See application file for complete search history.

(56) References Cited

U.S. PATENT DOCUMENTS 6,981,040 B1 12/2005 Konig
8,392,431 B1 * 3/2013 Agassy ............. G06Q 30/0282
707/748

(Continued)

OTHER PUBLICATIONS

The Global Information Technology Report 2012, Chapter 1.7, "Harnessing the Power of Big Data in Real Time through In-Memory Technology and Analytics" SAP AG, pp. 89-96 2012 World Economic Forum. http://www3.weforum.org/docs/GITR/2012/GITR_Chapter1.7_2012.pdf> Accessed on Sep. 1, 2015.

(Continued)

*Primary Examiner* — Keith D Bloomquist
(74) *Attorney, Agent, or Firm* — Keller Jolley Preece (57) ABSTRACT A method and system for providing adjusted content in a webpage are described. The system monitors traffic to a website and tracks users that are visiting the website to identify one or more parameters relating to relating to the user, including parameters associated with an identity of the user, navigation behavior for the user within the website, and usage of content by the user within the website. The system analyzes the parameters and selects at least one statistical algorithm for a type of the parameter, and based on the analysis, identifies an organization to which the user belongs. The system selects and presents content for the website to be presented to the user based on the analysis.

20 Claims, 9 Drawing Sheets (51) Int. Cl.
*G06Q 30/06* (2012.01)
*H04L 29/08* (2006.01)

(56) References Cited

U.S. PATENT DOCUMENTS

| | | | |
|---|---|---|---|
| 8,600,995 B1* | 12/2013 | Satish | G06Q 10/06 |
| | | | 707/737 |
| 9,552,356 B1* | 1/2017 | Edwards | G06F 17/5045 |
| 9,569,785 B2 | 2/2017 | Alon et al. | |
| 2005/0097008 A1* | 5/2005 | Ehring | G06F 17/211 |
| | | | 715/205 |
| 2005/0114510 A1* | 5/2005 | Error | G06Q 30/02 |
| | | | 709/225 |
| 2009/0076997 A1 | 3/2009 | Ducheneaut | |
| 2009/0112807 A1 | 4/2009 | Bahn | |
| 2010/0131835 A1 | 5/2010 | Kumar | |
| 2010/0318898 A1* | 12/2010 | Rees | G06F 17/2247 |
| | | | 715/236 |
| 2012/0151359 A1* | 6/2012 | Mysen | G06F 11/3438 |
| | | | 715/736 |
| 2012/0203584 A1 | 8/2012 | Mishor | |
| 2012/0246139 A1* | 9/2012 | Rao | G06F 16/951 |
| | | | 707/709 |
| 2013/0338333 A1 | 12/2013 | Stekkelpak | |
| 2013/0339333 A1 | 12/2013 | Chourney | |

OTHER PUBLICATIONS

U.S. Appl. No. 14/086,200, Jul. 22, 2015, Office Action.
U.S. Appl. No. 14/086,200, May 4, 2016, Office Action.
U.S. Appl. No. 14/086,200, Nov. 18, 2016, Notice of Allowance.

\* cited by examiner

METHOD FOR ADJUSTING CONTENT OF A WEBPAGE IN REAL TIME BASED ON USERS ONLINE BEHAVIOR AND PROFILE

RELATED APPLICATIONS

This application is a continuation of U.S. patent application Ser. No. 14/086,200 filed Nov. 21, 2013, which claim the benefit of U.S. Provisional Patent Application No. 61/728,865 filed Nov. 21, 2012, which applications are hereby incorporated by reference for all purposes.

TECHNICAL FIELD

The present invention relates to the field of content of webpages, and more particularly, to adjusting content of webpages to interest of viewers according to various parameters.

BACKGROUND ART

Current solutions for personalizing business websites content according to user profiles are implemented for business websites, which are targeted for consumers. However, the personalization of business websites content is enabled only for identified users that are adapting the shopping content and sale's promotion, according to known preferences and activity of the user.

Known in the art Real-time website personalization is using simple click stream data that exist on the browser level or e-commerce product catalog which is small scale data. In B2B the challenge is to be able to map relevant content to visitors based on business relevancy and stage in the sales cycle, the known solutions enable only "rule-based" personalization only for known users. It is the object of the present invention to detect anonymous users and engage content utilizing predictive analytics in real-time using big data processing.

SUMMARY OF INVENTION

The present invention provides a method for providing adjusted content in a webpage in a website. The method comprising the steps of: tracking users that are visiting the monitored website to identify one or more parameters relating to user identity, navigation behavior and/or content usage, analyzing the parameters that were identified selecting at least one statistical algorithm, which is relevant for the type of knowledge that was identified, real time monitoring user behavior including: identity, navigation path and/or content usage of each user in the monitored website, real time analyzing the monitored behavior according to the relevant statistical algorithm and real time replacing or adding content in the webpage to be presented for a specified user according analysis results in a specified part of the webpage.

According to some embodiments of the present invention the statistical algorithm is a clustering algorithm for classifying user into groups based in identification or navigation path parameters.

According to some embodiments of the present invention the statistical algorithm is a probability algorithm for creating probability based in identification of statistical association/correlation between sequence of users navigation and content selections.

According to some embodiments of the present invention the statistical algorithm is a neighborhood algorithm by applying collaborative filtering for classifying users into neighborhood groups based on content usage parameters.

According to some embodiments of the present invention the method further comprises the step of retrieving rules and the adjusted content from data storage for a specified classification.

According to some embodiments of the present invention the methods further comprises the step of, parsing the webpage in real time to specify part of the webpage where the content will be presented.

According to some embodiments of the present invention the method further comprises the step of analyzing actions in relation to their occurrence time.

According to some embodiments of the present invention the method further comprises the step of generating user anonymous profile based on analyzed behavior and group classification according user's industry and organization association.

According to some embodiments of the present invention the method further comprises the step of storing the analysis results in unique caching repository for enabling real time statistics and data retrieval for engagement, wherein the analysis results include one of the following: groups clustering, nearby neighbor groups or probability tree.

According to some embodiments of the invention, a method for providing adjusted content in a webpage in a website is provided herein. The method comprising the steps of: (i) monitoring traffic in a website for a predefined training period; (ii) tracking users that are visiting the monitored website to identify one or more parameters relating to user's identity and behavior; (iii) clustering users by generation of groups using analysis of the statistics of the parameters that were identified; (iv) monitoring behavior of each user in the monitored website; (v) analyzing the monitored behavior; (vi) assigning each user to a cluster of similar users based on unanalyzed behavior and group classification; (vii) retrieving rules and the adjusted content from a data storage for a specified classification; and (viii) replacing or adding content in the webpage to be presented for a specified user according to retrieved predefined rules in a specified part of the webpage.

These, additional, and/or other aspects and/or advantages of the present invention are: set forth in the detailed description which follows; possibly inferable from the detailed description; and/or learnable by practice of the present invention.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "big data" as used herein in this application, is defined as a collection of data sets that is so large and complex that it is not possible to handle with database management tools. As per Gartner, "Big Data are high-volume, high-velocity, and/or high-variety information assets that require new forms of processing to enable enhanced decision making, insight discovery and process optimization."

The term "anonymous profile" as used herein in this application, is defined as a viewer of a website that didn't identify by login process to the website.

The term "proprietary heuristics" as used herein in this application, is defined as experienced techniques that were developed by the applicant and are used when an exhaustive search is impractical.

The present invention aims for statically analyzing the behavior of anonymous users that are navigating in an Internet website based on their: content usage (selecting specific content to view or downloading content from the website navigational behavior (visits, clicks, selection URL), association to an organization, social network, history (number of visits), geo location, or industry. It is suggested, according to the present invention, to enable real time auto-engagement process of updating content of the Internet website for users based on their analyzed behavior, based on their related organization, by providing them personalized messages that are relevant to their associated industry, their geographic location or their behavior, as identified throughout their navigation (i.e. behavior) in the internet website.

The auto-engagement process provides a marketing strategy which known as "prospect nurturing". This marketing strategy enables delivery of personalized content to users and it is used today mostly by email communication, only for identified clients (i.e. users). The present invention allows real-time prospect nurturing for anonymous clients throughout their navigation in the website. It may provide anonymous potential clients with marketing information to bring them into sales' cycle.

In other words, the present invention allows a real-time auto-engagement process based on detection and behavior statistical analysis of anonymous users (i.e. potential clients). Anonymous users are normally at pre-lead state and nurturing them is called 'seed nurturing'.

In 'seed nurturing' the classification of users is performed by heuristics to find conversion patterns behavior (i.e. conversion from an anonymous user to a business lead) that are common between anonymous users. Conversion patterns are the pattern behavior of anonymous users that are becoming business leads after being exposed to a marketing material. For example, on his second visit to a website anonymous user sees a link to a white paper the user clicks on it and reads it, and fills out a form requesting more details thus becomes a business lead. Identification of such conversion patterns may be used for verifying or updating the predefined rules in the engagement rules of the web content adjustments.

Figure 1:
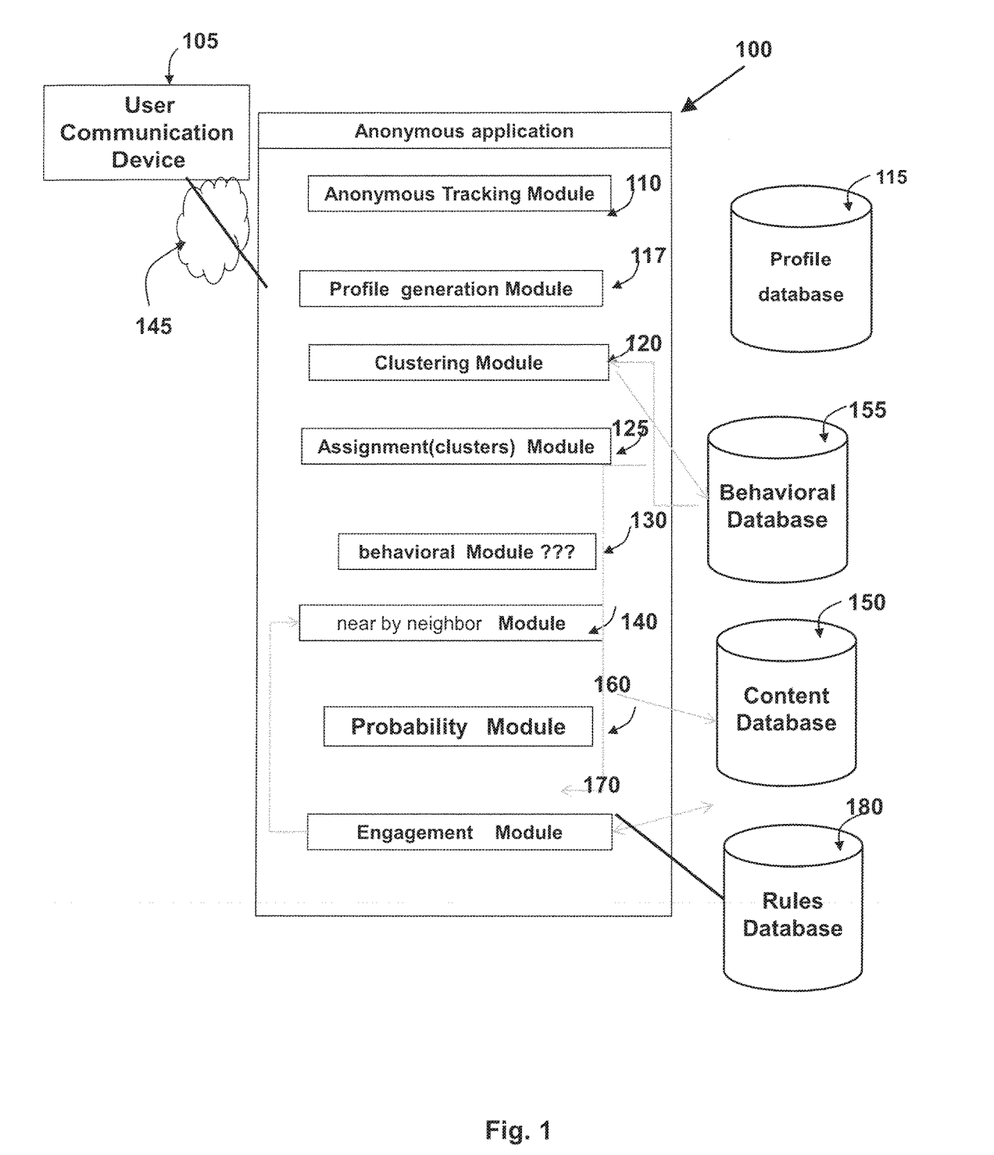
FIG. 1 is a block diagram of a system for adjusting content of webpages, according to some embodiments of the invention.

FIG. 1 is a block diagram of a system for adjusting content of webpages, according to some embodiments of the invention.

According to some embodiments of the present invention, web content adjusting application 100 aims to improve response of websites to traffic of viewers (i.e. users) that is coming via user communication devices 105. Improving the response of the websites is performed by adjusting, in real-time, the content of the webpage to a viewer, according to the viewer's behavior (i.e. navigation path) and other parameters. One of the parameters, which are taken into account, may be geographic origin of the viewer.

For example, a viewer from Zagreb that is navigating the same webpage in a monitored website as a viewer from Reykjavik, may see different content due to their different origin. As a result of process and analysis of the application for adjusting content of webpages 100 the viewer from Zagreb may see in a non limiting example, content regarding conferences in Zagreb and the viewer from Reykjavik may see content regarding salmon and trout fish. Such data content adjustment enables prospect nurturing, throughout the navigation session of an anonymous user (i.e. viewer).

According to some embodiments of the present invention, the web content adjusting application 100 may activate a tracking module 110 to generate a profile of an anonymous user (i.e. viewer) by various parameters and store it in a profile database 115 as will be described in detail in FIG. 2.

According to some embodiments of the present invention, a clustering module 120 may monitor viewers by various parameters and cluster them into groups, as will be described in detail in FIG. 3.

The process of clustering viewers into groups involves analysis of big data. In order to save time and computer resources, proprietary heuristics are being implemented. These proprietary heuristics are taking into account intersections of profiles of users and industries. For example, a profile of a viewer that was clustered into a group of venture capital industry may view content related to currency rate and stocks.

According to some embodiments of the present invention, an anonymous profile generating module 117 may handle data on each viewer and assign each viewer to a group, as will be described in detail in FIG. 4.

According to some embodiments of the present invention, an assignment module 125 may handle a profile of a user and assign it to a predefined group, as will be described in detail in FIG. 5.

According to some embodiments of the present invention, a behavior module 130 may analyze behavior pattern of the user, as will be described in detail in FIG. 6.

According to some embodiments of the present invention, a nearest neighbor module 140 may analyze behavior pattern of user's content usage, as will be described in detail in FIG. 7.

According to some embodiments of the present invention, a probability module 160 may analyze behavior pattern of correlation between users navigation content usage activates, as will be described in detail in FIG. 8.

According to some embodiments of the present invention, an engaging module 170 may operate content adjusting of a webpage in a website. The content may be retrieved from content database 150 according to: (i) specified rules which are retrieved from rules database 180; and (ii) received profile of a user.

Figure 2:
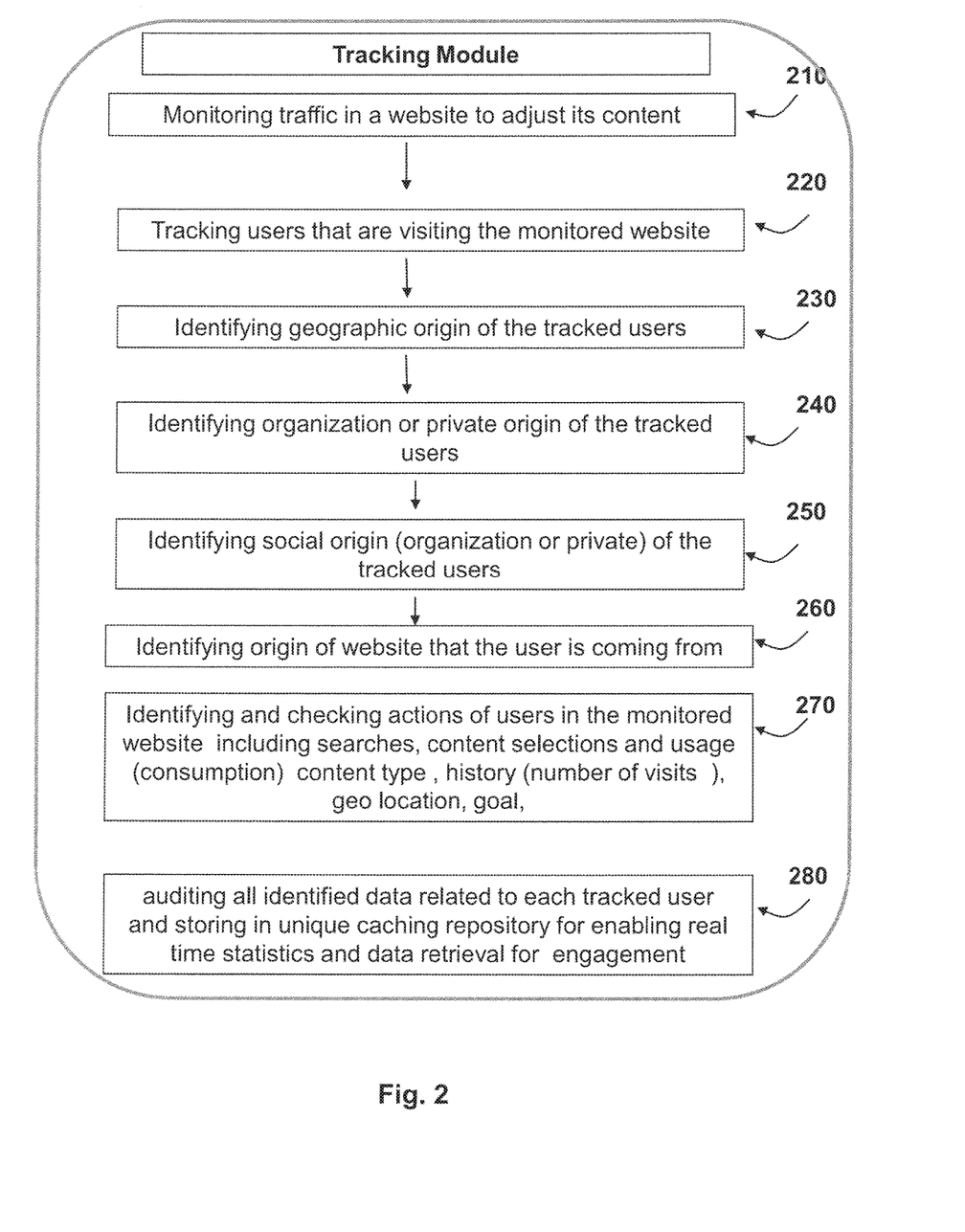
FIG. 2 is a flowchart illustrating a method of tracking users, according to some embodiments of the invention.

FIG. 2 is a flowchart illustrating a method of tracking users, according to some embodiments of the invention.

According to some embodiments of the present invention, tracking module 110 in FIG. 1 may monitor traffic in a specified website (stage 210).

According to some embodiments of the present invention, user communication device 105 in FIG. 1 of a viewer (i.e. user) that is navigating in the monitored website may be tracked to identify various parameters (stage 220) such as: (i) identifying geographic origin of the tracked viewer (stage 230); For example, a viewer coming from London and another viewer that is coming from New Delhi. (ii) identifying organization or private origin of the tracked viewer (stage 240); In other words, checking if the viewer is navigating from a workplace or from a residential place (iii) identifying social origin, of the tracked viewer, meaning checking if the user was referred from a social website such as Facebook™ (stage 250); (iv) identifying origin of website that the user is coming from (stage 260) For example, search engines like Google and Bing; and (v) identifying and checking actions of users (i.e. viewers) in the monitored website (stage 270). For example, search actions by keywords in the monitored website or navigating in a specific section of the website such as careers and openings, content selections and usage (consumption), content type, history (number of visits), geo location and goals.

According to some embodiments of the present invention, after performing various identifications, as mentioned above, the tracking module 110 in FIG. 1 may audit all identified data related to each tracked user and store it in a unique caching repository for enabling real time statistics and data retrieval future engagements (stage 280).

Figure 3:
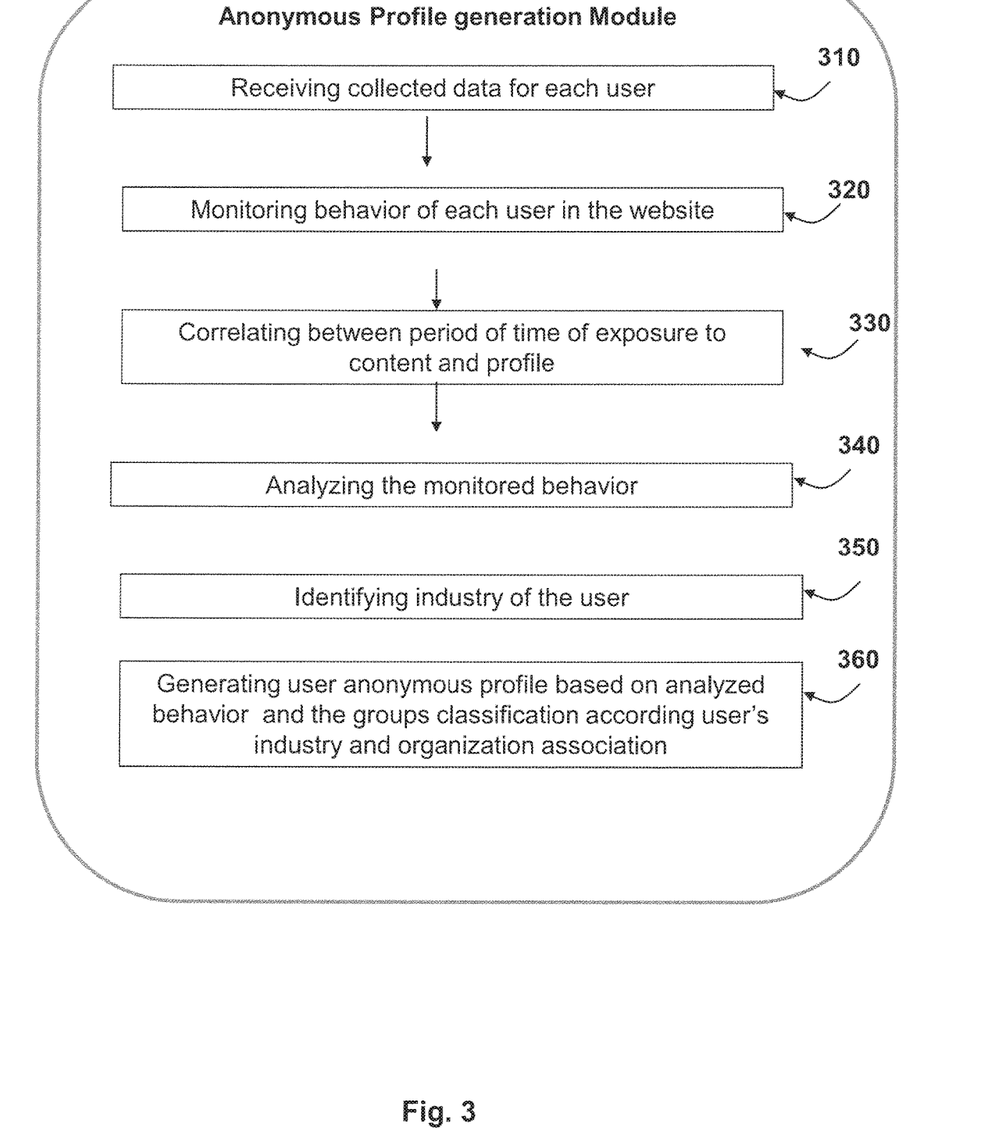
FIG. 3 is a flowchart illustrating a method of generating anonymous profile of a user, according to some embodiments of the invention.

FIG. 3 is a flowchart illustrating a method of generating anonymous profile of a user, according to some embodiments of the invention.

According to some embodiments of the present invention, anonymous profile generation module 125 in FIG. 1 may receive data for each user (stage 310) that was collected from tracking module 110. Next, behavior of each user in the website may be monitored (stage 320).

According to some embodiments of the present invention, period of time of exposure to webpages in the website may be checked and correlated with content and profile of users (stage 330).

According to some embodiments of the present invention, the monitored behavior may be analyzed (stage 340) and industry of the user may be identified (stage 350).

Figure 4:
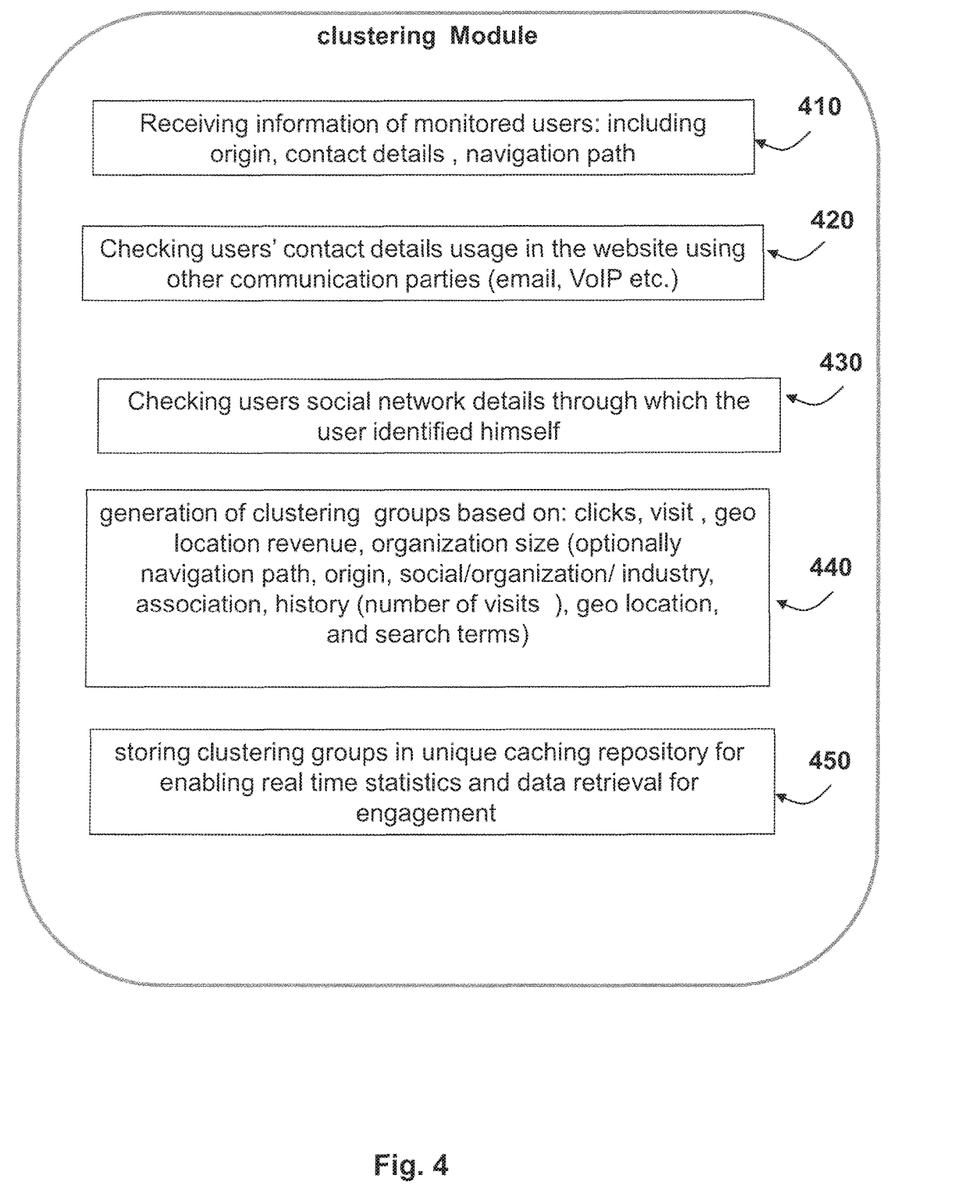
FIG. 4 is a flowchart illustrating a method of clustering algorithm, according to some embodiments of the invention.

According to some embodiments of the present invention, the generation of user anonymous profile (step 360) is based on analyzed behavior and the groups classification according user's industry and organization association FIG. 4 is a flowchart illustrating a method of clustering algorithm, according to some embodiments of the invention.

According to some embodiments of the present invention, clustering module 120 in FIG. 1 may monitor users that are navigating in a specified website (stage 410). During the monitoring, some or all of the following information of monitored users is collected: origin details, contact details, navigation path (stage 410).

According to some embodiments of the present invention, clustering module 120 is checking usage of user's contact details in the website via the website and other communication parties such as email, etc. (stage 420). The clustering module may check feedback and action of the users that are navigating in the monitored website such as registering to the monitored website (including its services) or initiation of contact via the website by the user such as, sending an email or calling representatives of the monitored website. Such information can be used to indicate on successful matching between the users' profile and behavior and the presented content adjusted by the application 100 in FIG. 1.

According to some embodiments of the present invention, clustering module 120 in FIG. 1 may check users' login to the website via a social network website such as Facebook™ (stage 430).

Finally, clustering module 120 in FIG. 1 may cluster users by generation of groups using analysis of statistics of the results of all checks and identifications as mentioned above (step 440): clicks, visit, geo location revenue, organization size (optionally navigation path, origin, social/organization/industry, association, history (number of visits), geo location, search terms, user's behavior including navigation path, selections, keyword used in information searches, and user feedback. The classification process may find correlation between the different parameters which characterize the user profile and its behavior for identifying groups of users which their characteristics indicate of at least one common interest or common behavior, such that the same content may be targeted to most users of the group.

The generation of groups may be based on the analyzed behavior using proprietary heuristics that where collected regarding user's behavior as described above.

The proprietary heuristics techniques are used to analyze the user's grouping clustering data for reducing the scale of the big data problem by cross analyzing the group clustering data according to industry or organization association of the user. In other words, instead of processing a large amount of data in case of a matching of a user to a group it may require to process only reduced amount of data records of group clustering data, using the heuristics related to the industry or organization association which may reduce usage of resources such as computer resources and time in the process.

To provide quick response, i.e. in less than 50 milliseconds, the present application clusters big data based on timeline of the navigation process, public digital organization and/or social data and actual visit timestamp. Indexing the data based on those parameters makes it possible to track trends, and retrieve relevant data for personalization of "anonymous users" while maintaining of a sustainable data model.

According to some embodiments of the present invention, clustering module may storing clustering groups in unique caching repository for enabling real time statistics and data retrieval for engagement.

The unique caching repository utilizes in-memory optimized matrix model, which allow real-time interactions on big data. This model is optimized for the usage of each statistical algorithm by implementing one of the following: high density matrix which filters out the low relevancy recommendation mapping, aggregated clustering data (hence eliminating duplicate content items records) or caching next best offer based on visitor timeline to enable real-time retrieval while the user navigates through the website and/or filtering out, less relevant or deprecated/older users.

Figure 5:
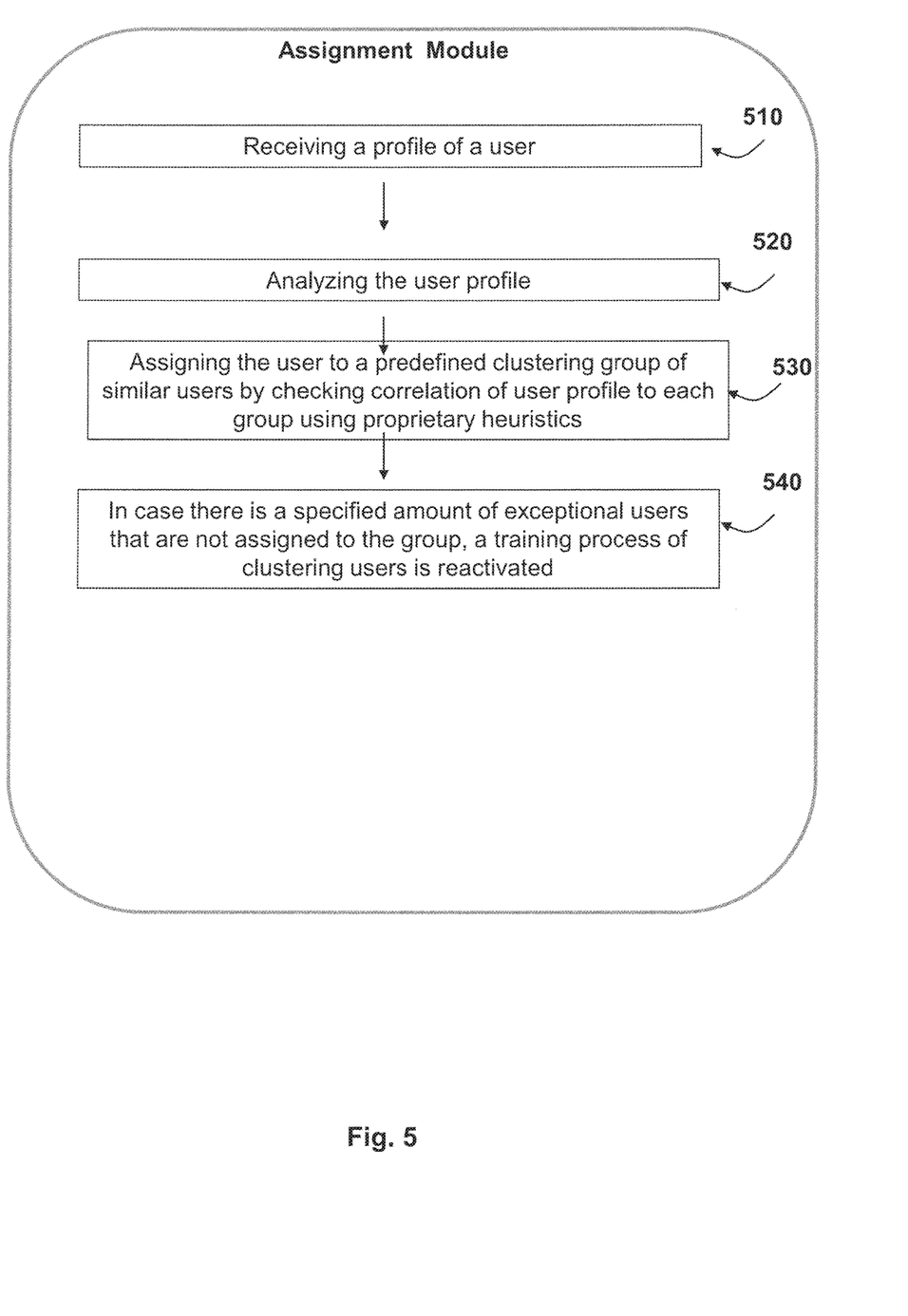
FIG. 5 is a flowchart illustrating a method of assigning users to clustered groups, according to some embodiments of the invention.

FIG. 5 is a flowchart illustrating a method of assigning users to clustered groups, according to some embodiments of the invention.

According to some embodiments of the present invention, assignment module 125 may receive a profile of a user (stage 510) and analyze it (stage 520). Next, assignment module 125 may assign the user to a predefined group by the profile of the user and the correlation (stage 530). The present application suggests classification process which utilizes correlation of time and IP and name of an organization to identify visitors and their clustered groups.

Finally, in case there is a specified amount of exceptional users that are not assigned to the group, a training process of clustering of profiles of users is reactivated (stage 540). The users' profiles and behavior may change over time; therefore accordingly the group clustering has to be adapted to reflect the change. The present invention provides dynamic model by continuously analyzing statistically users' profile and behavior in comparison to the group clustering definition and identifying when statistically the amount of exceptional users has exceeded a predefined level. In this case, the training process is reactivated for a predefined time period for redefining the group clustering.

Figure 6:
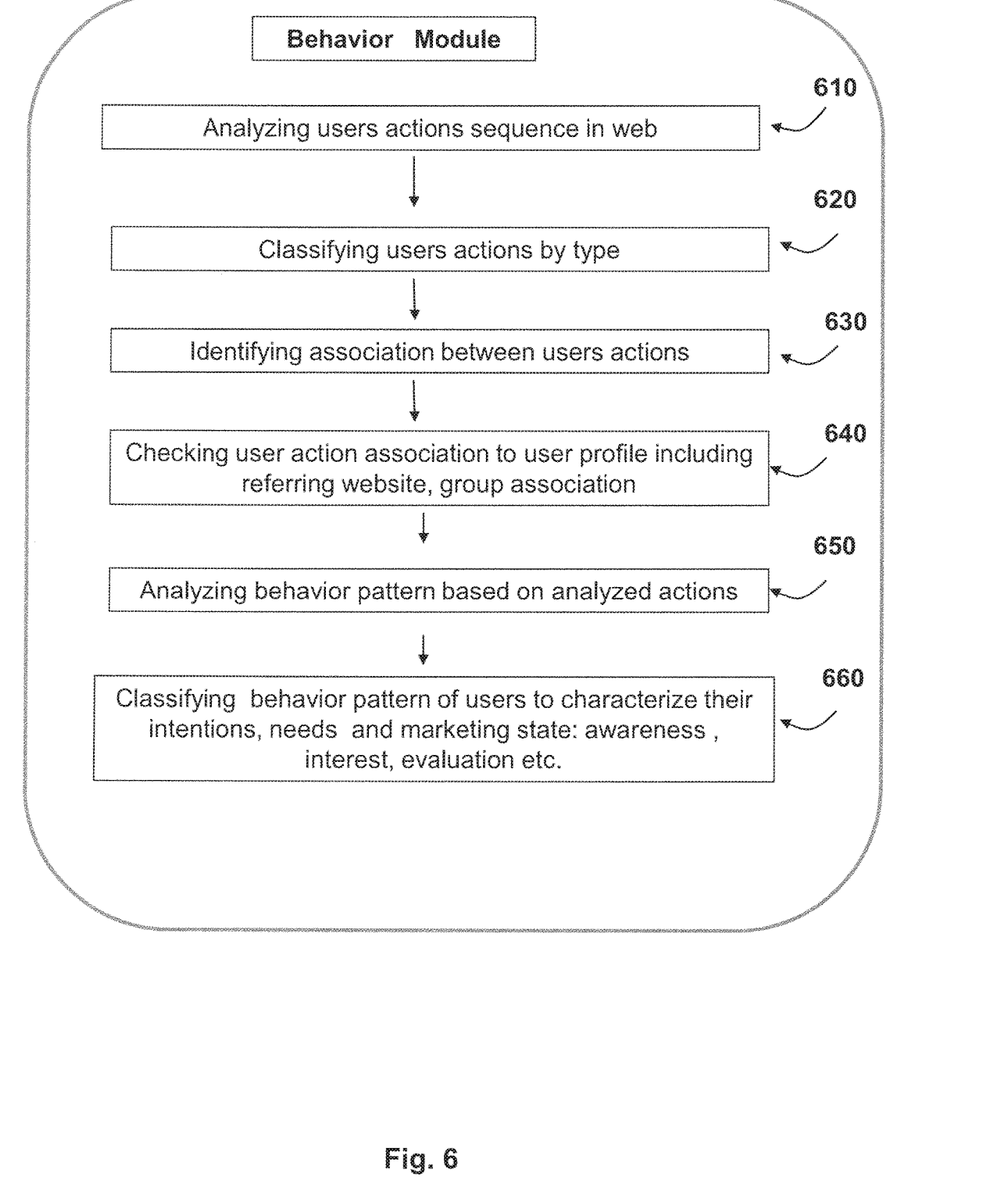
FIG. 6 is a flowchart illustrating a method of analyzing behavior pattern, according to some embodiments of the invention.

FIG. 6 is a flowchart illustrating a method of analyzing behavior pattern, according to some embodiments of the invention. This module analyzes user actions sequence in web for classifying user's actions by type and identifying association between user's actions (step 610). Optionally the modules checks, user action in association to user profile including referring website, group association (step 620). Based on analyzed action sequence is identified behavior pattern (step 650), the identified behavior pattern is classified to characterize user intentions, needs and marketing state/status in a sale, such as: awareness, interest, evaluation etc. (step 660). At the last step the module may assign each user to a group of similar users based on the analyzed behavior pattern (step 670).

Optionally user profiles and pattern behavior are analyzed and associated with data in the CRM database.

Figure 7A:
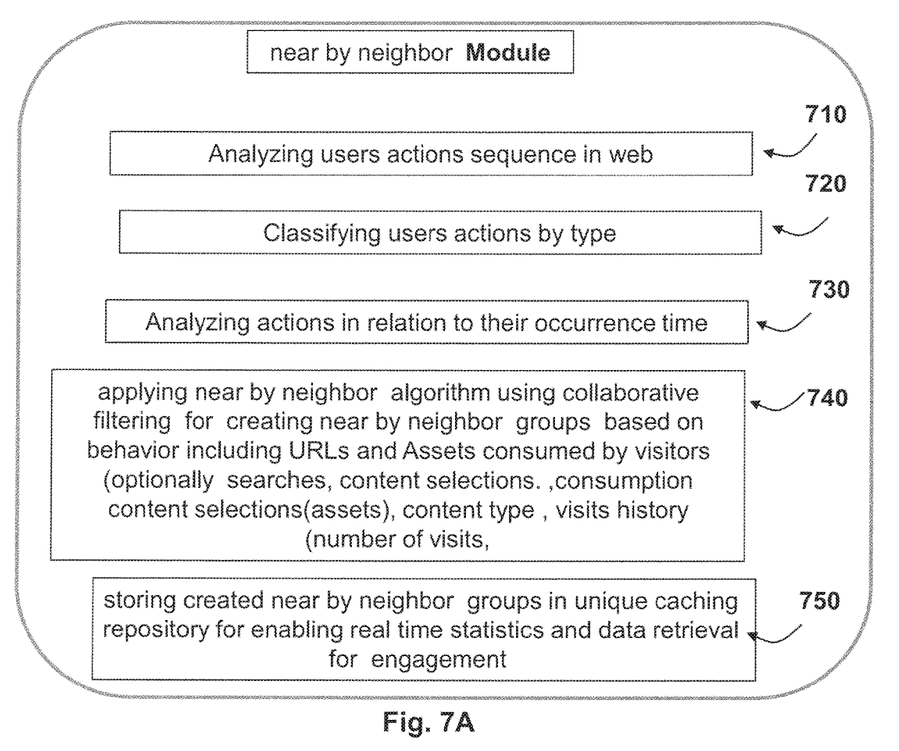
FIG. 7A is a flowchart illustrating a method of near by neighbor algorithm, according to some embodiments of the invention.

FIG. 7A is a flowchart illustrating a method of nearest neighbor algorithm, according to some embodiments of the invention. The nearest neighbor algorithm include the following steps: analyzing users actions sequence in web such as sequence of content selection and usage (step 710), classifying users actions by type to identify content consumption action (step 720), analyzing actions in relation to their occurrence time (step 730), for example if they occurred in the first visit of the user or the second one and finally applying nearest neighbor algorithm using collaborative filtering (step 740) for creating nearby neighbor groups based on behavior including URLs and content items (Asset) consumed by visitors. Optionally the creation neighbor groups, is further depended on search terms, content selections, content type, visits history (number of visits). The created nearby neighbor groups are stored in unique caching repository for enabling real time statistics and data retrieval for engagement (step 750).

Figure 7B:
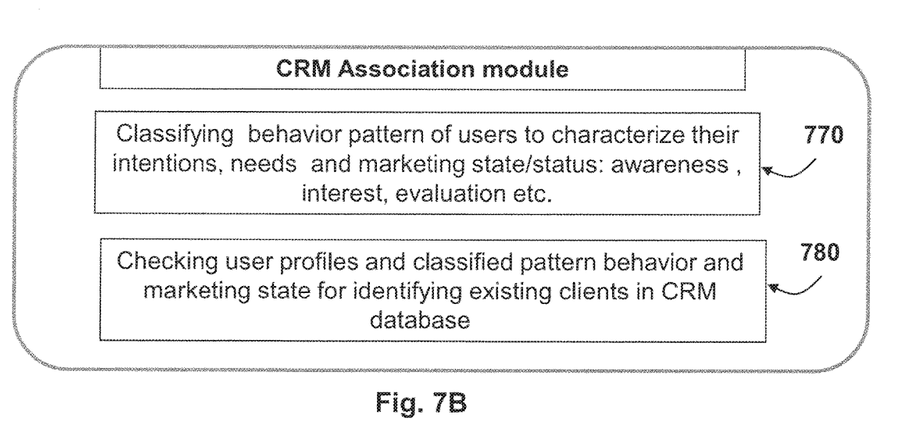
FIG. 7B is a flowchart illustrating a method of CRM Association module, according to some embodiments of the invention.

FIG. 7B is a flowchart illustrating a method of CRM Association module, according to some embodiments of the invention. The CRM Association module apply one of the following steps: classifying behavior pattern of users to characterize their intentions, needs and marketing state/ status within a sale scenario (step 770), such as awareness, interest, evaluation etc. Based on user profiles, classified pattern behavior and marketing state are identified returning clients in CRM database (step 780).

Figure 8:
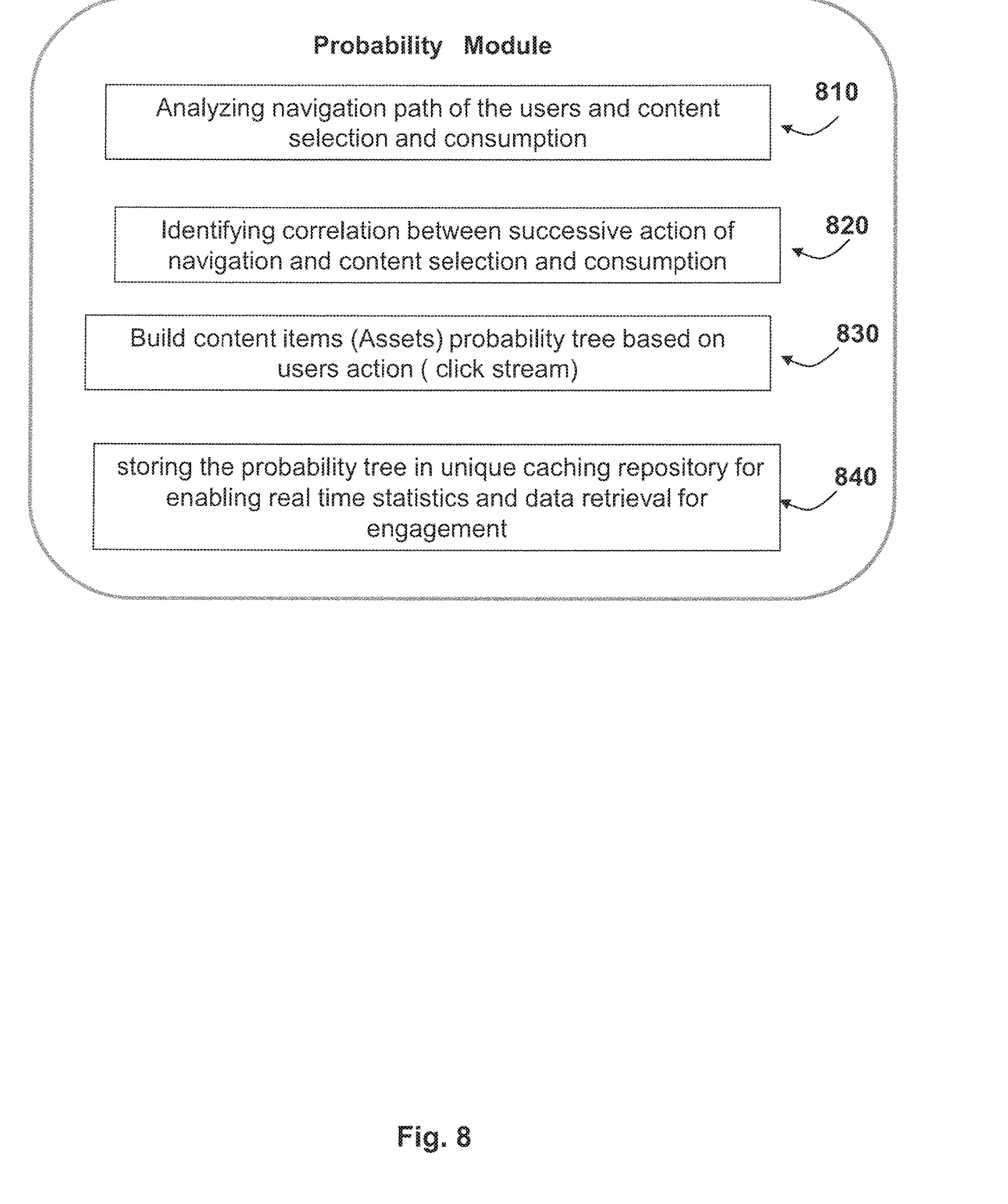
FIG. 8 is a flowchart illustrating a method of probability algorithm, according to some embodiments of the invention.

FIG. 8 is a flowchart illustrating a method of probability algorithm, according to some embodiments of the invention. The probability module apply at least one of the following steps: analyzing navigation path of the users and content selection and consumption (step 810), identifying statistics correlation or association between successive action of navigation and content selection and consumption (step 820), build content items (Assets) probability tree based on users action (click stream) or identified correlation (step 830) and storing the probability tree in unique caching repository for enabling real time statistics and data retrieval for engagement (step 840).

Figure 9:
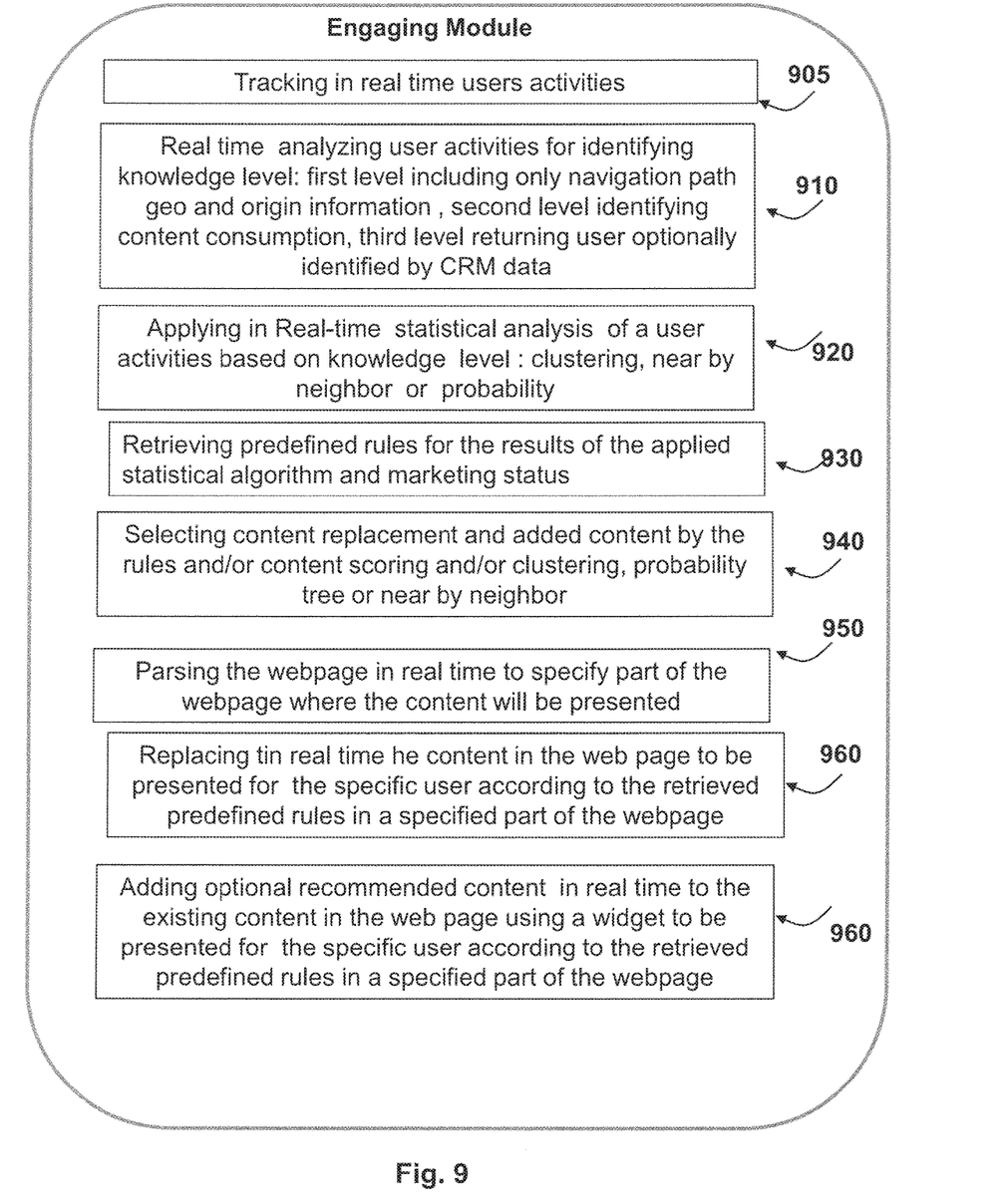
FIG. 9 is a flowchart illustrating a method of engaging module, according to some embodiments of the invention.

FIG. 9 is a flowchart illustrating a method of providing content to a user, according to some embodiments of the invention.

According to some embodiments of the present invention, engaging module 140 in FIG. 1 may perform at least one of following steps: Tracking in real time users activities (step 905) and analyzing in real time user activities for identifying type of identified parameters (knowledge level): first level including only navigation path, geo location and/or origin information, second level including identifying content usage (consumption), third level in case the visitor is a returning user identified by CRM data (step 910). At the next step the modules applies in real-time statistical analysis of a user activities based on knowledge level using clustering, nearest neighbor or probability algorithm (step 920).

Optionally predefined rules are retrieved from the rules database 155 to be applied on the results of the statistical algorithm and/or marketing status (steps 930). At the next stage, the module selects content for replacement and/or recommended content to be added to the website according to one of the following options: content scoring and/or group clustering, probability tree or nearest neighbor grouping (step 940). Optionally content is selected by using the retrieved the rules. For replacing or adding the content the modules parses the webpage in real time to specify part of the webpage where the content will be presented (step 950). Once identifying the location of the content to be replaced in the website, the module replaces in real time the content in the web page to be presented for the specific user according to the selected content in a specified part of the webpage (step 960) and/or adding optional recommended content in real time to the existing content in the web page using a widget to be presented for the specific user according to selected content in a specified part of the webpage (step 970)

These predefined rules, represent the owner prospect nurturing strategic schemes, which define what content should be displayed to each group of users based on their navigation behavior, behavior pattern or organization behavior pattern.

For example if clustering algorithm is applied and the user is classified to one of the clustering groups, at the next step, the engaging module 140 in FIG. 1 may retrieve predefined rules for the received classification from rules database 155 in FIG. 1 and replacement content maybe selected by the rules.

The usage of predefined rules is optional and the content to be displayed can be directly selected based on content scoring or the content items probability tree, or according to content items clustering which is based on tracking and classifying content usage according to multiple attributes relating to the user which consumed the content, such as clicks, visits, geo location, industry, organization size or revenue or search terms. Based on the content items clustering a distance metric is generated for providing relevant recommendation.

The rules and content to be updated are predefined, in relation to the respective group of users and their current navigation path by the owners of the website.

This process of changing or adding information to existing websites, does not require receiving or changing the code of the monitored website. Accordingly to some embodiments of the present invention, the web content adjusting application 100 can be implemented easily, at any client site, not requiring any adjustments or settings to the client website.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A method comprising:
    monitoring traffic from a plurality of users to a website;
    tracking a user from the plurality of users visiting the web site to identify a plurality of parameters relating to the user, including a first parameter associated with an identity of the user and a second parameter associated with navigation behavior for the user within the website;
    based on selecting a statistical algorithm for each of the plurality of parameters corresponding to a type of parameter, applying a first statistical algorithm to analyze the first parameter associated with the identity of the user and a second statistical algorithm to analyze the second parameter associated with the navigation behavior for the user within the website;
    based on applying the first statistical algorithm and the second statistical algorithm, identifying an organization to which the user belongs;
    selecting content for the website to be presented to the user based on an analysis of each of the plurality of parameters according to the selected statistical algorithm, the organization to which the user belongs, and a marketing stage in a sale process for the user, wherein the content is selected from a plurality of content items stored in a content database; and
    presenting the selected content in a webpage of the website to the user.

2. The method of claim 1, wherein the first statistical algorithm or the second statistical algorithm comprises a clustering algorithm for classifying the user into one of a plurality of groups based on at least one of the plurality of parameters.

3. The method of claim 1, wherein the second statistical algorithm comprises a probability algorithm for creating a probability tree based on identification of statistical correlation between a sequence of the navigation behavior of the user and content selections on the website.

4. The method of claim 1, further comprising:
    identifying a third parameter associated with usage of content by the user within the website; and
    based on selecting the statistical algorithm for each of the plurality of parameters corresponding to the type of parameter, applying a third statistical algorithm to analyze the third parameter associated with usage of content by the user within the website.

5. The method of claim 4, wherein the third statistical algorithm comprises a nearest neighbor algorithm for applying a collaborative filtering and classifying users into neighborhood groups based on content usage parameters.

6. The method of claim 1, wherein the selected content is presented in a part of the webpage selected by parsing the webpage in real time.

7. The method of claim 1, further comprising analyzing actions of the user interacting with the web site in relation to an increment of time between the actions of the user.

8. The method of claim 1, further comprising:
generating an anonymous user profile for the user, the anonymous user profile including at least one of the plurality of parameters; and
storing the anonymous user profile corresponding to the user in a profile database.

9. The method of claim 1, further comprising storing an analysis of each of the plurality of parameters according to the selected statistical algorithm in a unique caching repository and enabling real time statistics and data retrieval for user engagement.

10. The method of claim 1, wherein selecting the content for the website comprises selecting the content based on a content-items-clustering algorithm, including classifying the plurality of content items into groups and analyzing a plurality of attributes of each one of the plurality of users who consumed each one of the plurality content items.

11. A system comprising:
at least one processor;
at least one non-transitory computer readable medium comprising instructions that, when executed by the at least one processor, cause the system to:
monitor traffic from a plurality of users to a website;
track a user from the plurality of users visiting the website to identify a plurality of parameters relating to the user, including a first parameter associated with an identity of the user and a second parameter associated with navigation behavior for the user within the website;
based on selecting a statistical algorithm for each of the plurality of parameters corresponding to a type of parameter, apply a first statistical algorithm to analyze the first parameter associated with the identity of the user and a second statistical algorithm to analyze the second parameter associated with the navigation behavior for the user within the website;
based on applying the first statistical algorithm and the second statistical algorithm, identify an organization to which the user belongs; and
select content for the website to be presented to the user based on an analysis of each of the plurality of parameters according to the selected statistical algorithm, the organization to which the user belongs, and a marketing stage in a sale process for the user, wherein the content is selected from a plurality of content items stored in a content database; and
present the selected content in a webpage of a website to the user.

12. The system of claim 11, wherein the first statistical algorithm or the second statistical algorithm comprises a clustering algorithm for classifying the user into one of a plurality of groups based on at least one of the plurality of parameters.

13. The system of claim 11, wherein the second statistical algorithm comprises a probability algorithm for creating a probability tree based on identification of statistical correlation between a sequence of the navigation behavior of the user and content selections on the website.

14. The system of claim 11, further comprising instructions that, when executed by the at least one processor, cause the system to:
identify a third parameter associated with usage of content by the user within the website; and
based on selecting the statistical algorithm for each of the plurality of parameters corresponding to the type of parameter, apply a third statistical algorithm to analyze the third parameter associated with usage of content by the user within the website.

15. The system of claim 14, wherein the third statistical algorithm comprises a nearest neighbor algorithm for applying a collaborative filtering and classifying users into neighborhood groups based on content usage parameters.

16. The system of claim 11, wherein the selected content is presented in a part of the webpage selected by parsing the webpage in real time.

17. The system of claim 11, further comprising instructions that, when executed by the at least one processor, cause the system to analyze actions of the user interacting with the website in relation to an increment of time between the actions of the user.

18. The system of claim 11, further comprising instructions that, when executed by the at least one processor, cause the system to:
generate an anonymous user profile for the user, the anonymous user profile including at least one of the plurality of parameters; and
store the anonymous user profile corresponding to the user in a profile database.

19. The system of claim 11, further comprising instructions that, when executed by the at least one processor, cause the system to:
store an analysis of each of the plurality of parameters according to the selected statistical algorithm in a unique caching repository; and
enable real time statistics and data retrieval for user engagement.

20. A non-transitory computer readable medium storing instructions thereon that, when executed by at least one processor, cause a computer system to:
monitor traffic from a plurality of users to a website;
track a user from the plurality of users visiting the website to identify a plurality of parameters relating to the user, including a first parameter associated with an identity of the user and a second parameter associated with navigation behavior for the user within the website;
based on selecting a statistical algorithm for each of the plurality of parameters corresponding to a type of parameter, apply a first statistical algorithm to analyze the first parameter associated with the identity of the user and a second statistical algorithm to analyze the second parameter associated with the navigation behavior for the user within the website;
based on applying the first statistical algorithm and the second statistical algorithm, identify an organization to which the user belongs; and
select content for the website to be presented to the user based on an analysis of each of the plurality of parameters according to the selected statistical algorithm, the organization to which the user belongs, and a marketing stage in a sale process for the user, wherein the content is selected from a plurality of content items stored in a content database; and
present the selected content in a webpage of the website to the user.

* * * * *